W. B. SEWELL.
WING FOR WINDSHIELDS.
APPLICATION FILED SEPT. 20, 1920.

1,416,423.

Patented May 16, 1922.
2 SHEETS—SHEET 1.

Inventor
Wm B. Sewell.
By
Attorney

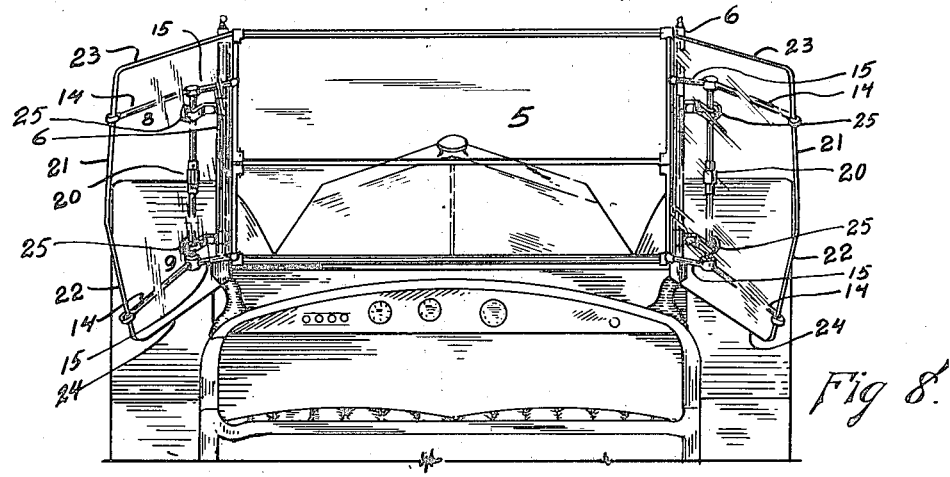
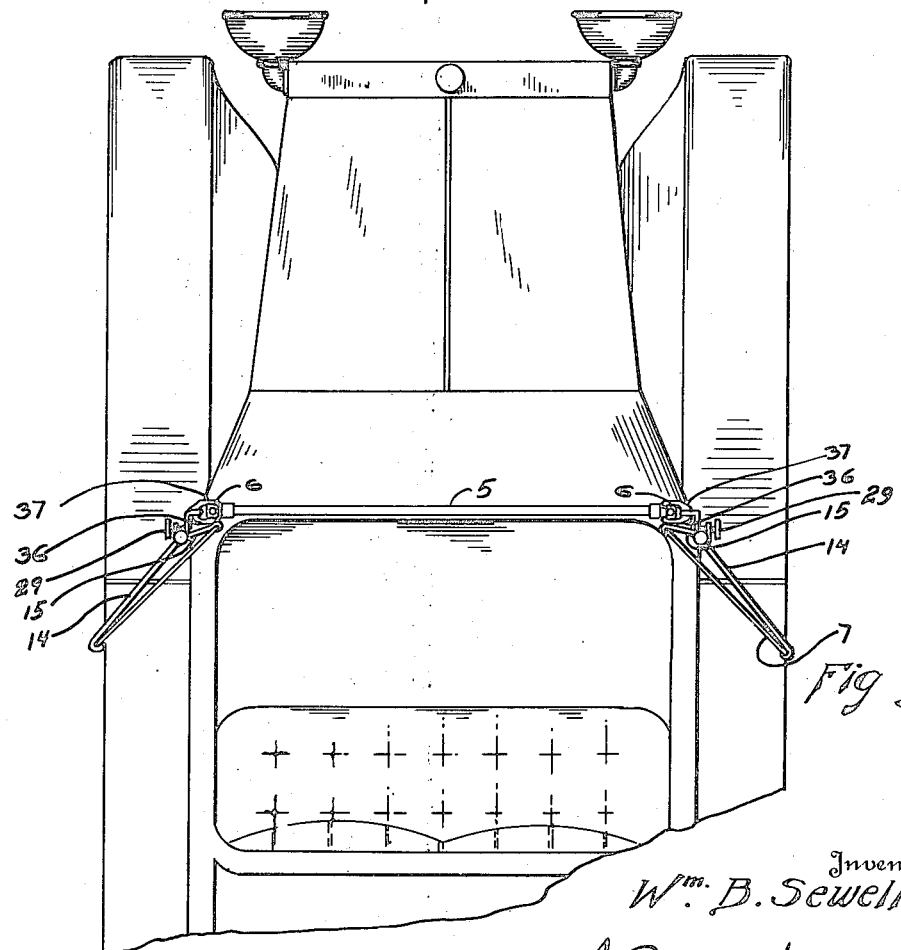

UNITED STATES PATENT OFFICE.

WILLIAM B. SEWELL, OF DENVER, COLORADO, ASSIGNOR, BY MESNE ASSIGNMENTS, TO THE SEWELL-HUNT MANUFACTURING COMPANY, INCORPORATED, OF DENVER, COLORADO, A CORPORATION OF COLORADO.

WING FOR WINDSHIELDS.

1,416,423.  Specification of Letters Patent.  Patented May 16, 1922.

Application filed September 20, 1920. Serial No. 411,611.

*To all whom it may concern:*

Be it known that I, WILLIAM B. SEWELL, citizen of the United States, residing in the city and county of Denver, and State of Colorado, have invented certain new and useful Improvements in Wings for Windshields; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in wings for windshields of automobiles or other vehicles, my object being to provide a simple and efficient device of this character adapted to be suitably connected with the end bars of the ordinary windshield in such a manner as to divert any undesirable draft of air from the occupants of the car, or otherwise as may be desired. The device is adjustable so that it may be made to occupy any desired angle with reference to the windshield proper, this of course being necessary in order to perform the aforesaid function.

Generally speaking, the device consists of a plate glass member having beveled edges, the outer upright edge of the device being inclined outwardly from its opposite ends, the opposite or inner edge of the glass being preferably straight. The glass is held in place by means of two angle shaped brackets whose ends engage the opposite edges of the glass, the two brackets being connected by a rod composed of two members connected by a turnbuckle whereby the two brackets are vertically adjustable for tightening purposes, the inclined edge of the glass co-operating to produce this result. The angularity of the brackets is important for the reason that the bracket parts between the edges of the glass do not come in direct contact with the glass, thus enhancing the clearness of vision through the glass. It will thus be observed that the holder for the glass is a skeleton structure composed of relatively small parts, so that the view through the glass is not obstructed to any appreciable extent. The rod which connects the two brackets is provided with two clips which are tightened upon the rod by means of thumb screws, each clip being further connected with a universal clamp, the two clamps being connected with the upright bar at the end of the main windshield, for the purpose of mounting the wing securely in place.

Having briefly outlined my invention, I will proceed to describe the same in detail, reference being made to the accompanying drawings in which is illustrated an embodiment thereof.

In this drawing:

Fig. 8 is a view showing a pair of my improved wings in use and positioned to direct the wind away from the occupants of the car, looking forwardly from a point in the rear of the wind shield.

Fig. 9 is a top plan view of the same.

Figure 1:
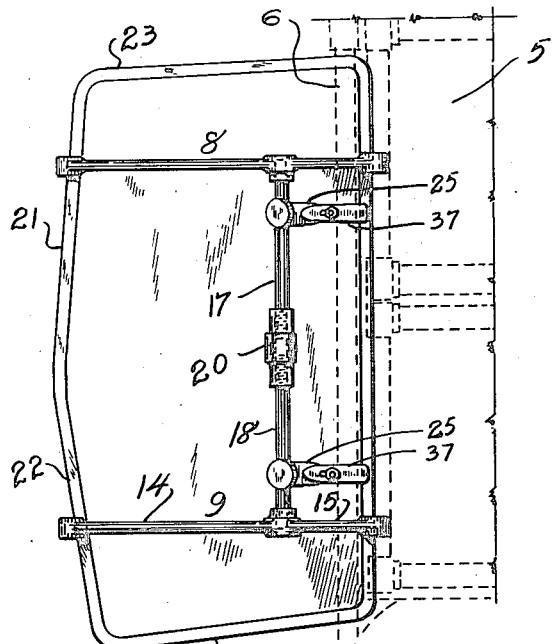
Fig. 1 is a front view of one of my improved windshield wings shown mounted upon the windshield proper, the latter being shown in dotted lines and partly broken away.
Figure 2:
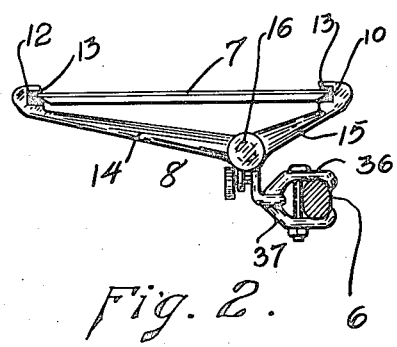
Fig. 2 is a top view of the structure illustrated in Fig. 1, the windshield bar being shown in horizontal section.
Figure 3:
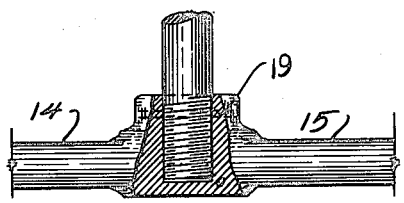
Fig. 3 is an enlarged detail view partly in section, illustrating the manner of connecting each rod member with its corresponding bracket, the parts being shown on a larger scale.
Figure 4:
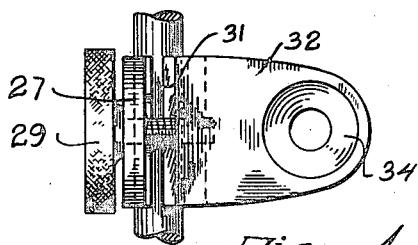
Fig. 4 is a top plan view of one of the clips which engage the rod members, also shown on a larger scale.
Figure 5:
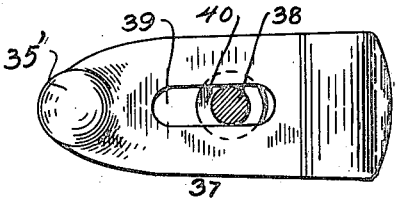
Fig. 5 is a similar view of one of the universal clamp members, the bolt for connecting the clamp members being shown in cross section.

The same reference characters indicate the same parts in all the views. Let the numeral 5 designate the glass of an automobile windshield, the latter being shown by dotted lines and partly broken away in Fig. 1. The numeral 6 designates one of the side posts of the windshield and which forms the support for my improved wing, the latter consisting of a plate glass member 7 whose opposite edges are engaged by upper and lower brackets 8 and 9, the ends of these brackets being grooved as shown at 10 and 12 to receive packing 13, which is directly engaged by the beveled edges of the glass 7. The two arms 14 and 15 of each of these brackets form an obtuse angle with each other and at their junction is located a reinforcement or hub 16 which contains a threaded cavity into which is screwed one extremity of a rod member which is threaded for the purpose. There are two of these rod members, the same being designated by the numerals 17 and 18, respectively, the outer extremity of each engaging one of the brackets, each rod member being connected with its bracket by means of a pin 19 which prevents the rod from turning in the bracket when the parts are assembled. The inner extremity of each rod member is threaded into a turnbuckle 20, which is of the usual character and provided with right and left threads whereby as the turnbuckle is adjusted, the rod members are moved toward or away from each other, as may be desired. During the adjustment for the purpose of assembling the parts of the wing, the two brackets 8 and 9 are drawn toward each other and they are tightened on the glass member 7 of the wing by virtue of the inclined edges 21 and 22 of the glass which are inclined outwardly from the upper and lower ends 23 and 24 of the glass. Hence as they move inwardly toward the turnbuckle, the brackets are securely tightened, whereby the glass is held firmly in place against any possible jar or independent vibration, and absolutely preventing any rattling tendency when the device is in use. Again by virtue of the beveled edges of the glass, these edges are wedged into the packing in the recesses or grooves in the opposite ends of the brackets, thus preventing any tendency toward breakage of the glass, as the latter is retained in cushioning engagement with the brackets.

Figure 7:
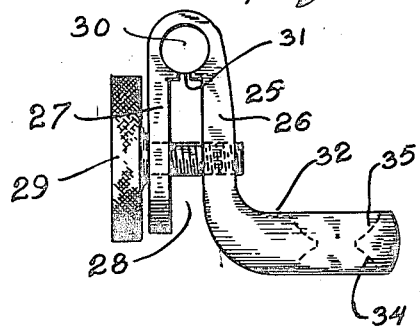
Fig. 7 is a detail elevation of one of the spring clips, showing the thumb screw.
Figure 6:
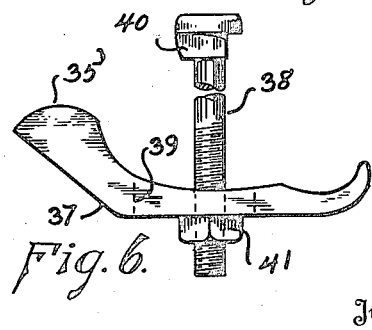
Fig. 6 is a side elevation of the same.

Upon each rod member 17 and 18 is mounted a clip 25, whose body member is U shaped and composed of two parts 26 and 27 which are spaced as shown at 28 and connected by a thumb screw 29. The closed end of the clip is provided with an opening 30 which engages the rod member 17 or 18 as the case may be, the said opening being in communication with the space 28 by means of a slot 31. When the clip is originally made, the opening is closed, the slot 31 being formed by sawing through the narrow wall separating the opening 30 from the space 28. By virtue of the slot 31 and the yielding character of the arms 26 and 27, the clip may be tightened or loosened upon the rod member as may be desired, by the proper adjustment of the thumb screw. The part 26 of the clamp by means of an approximately right-angled bend merges into a part 32 which is provided with an opening consisting of ball shaped sockets 34 and 35 which are indicated by dotted lines in Fig. 7. These sockets are constructed to receive the ball extremities 35' of two members 36 and 37 of a clamp which by virtue of the engagement of its members with the clip is adjustable to fit the post 6 of the windshield, regardless of its shape in cross section. The two clamp members are connected by a bolt 38 which passes through slots 39 with which each member is provided and whereby the bolt may be moved for purposes of adjustment. The bolt is provided with a lug 40 adjacent its head, which fits into the slot 39 of the adjacent member 36 for the purpose of preventing the bolt from turning while tightening the nut 41 which is applied to the threaded end of the bolt.

From the foregoing description the use and operation of my improved windshield wing will be readily understood. In assembling the parts the two brackets 8 and 9 are drawn together upon the glass 7 through the instrumentality of the turnbuckle and the two rod members 17 and 18 as heretofore explained. The clips 25 are then connected with the clamps, after which the latter may be applied to the post 6 of the windshield at the opposite ends of the latter, as heretofore explained in detail. By loosening the thumb screws 29 of the clips, the wing is rotatably adjustable whereby it may be caused to occupy any desired position with reference to the windshield. In other words, it may be either parallel or form any desired angle with the plane of the windshield for the purposes heretofore explained.

Attention is called to the fact that the rod composed of the two parts 17 and 18 is disposed nearer one of the side edges of the glass than the other. This is due to the fact that the arms 15 of the brackets 8 and 9, which engage the inner or straight edge of the glass, are considerably shorter than the companion arms 14 which engage the outer inclined edge thereof, thus leaving the view through a relatively large outer area of the glass of each wing practically unobstructed.

My present application is a substitute for my earlier application entitled Windshield wings, filed October 31, 1919, Serial 334,644, and so far as the two relate to common subject matter, is a continuation thereof.

I claim:

1. A windshield wing comprising a shield member having two opposite upright sides converging towards their ends, two brackets engaging the opposite upright side edges of the member, and movable vertically thereon for tightening and releasing purposes, a rod connecting the two brackets and adjustable to effect the aforesaid movement of the brackets, and means for supporting the rod.

2. A windshield wing comprising a shield member having two opposite upright sides converging towards their ends, two brackets engaging the opposite upright side edges of the member and movable vertically thereon for tightening and releasing purposes, a rod located nearer one of the side edges of the shield member than the other, said rod connecting the two brackets and being adjustable to effect the aforesaid movement of the brackets.

3. A windshield wing comprising a shield member having two opposite upright sides converging towards their ends, two brackets engaging the opposite upright side edges of the member and movable vertically thereon for tightening and releasing purposes, each bracket being composed of two arms disposed in angular relation and free from the shield member except where their ends engage the same.

4. A windshield wing comprising a shield member having two opposite upright sides converging towards their ends, two brackets engaging the opposite side edges of the member and movable vertically thereon for tightening and releasing purposes, each bracket being composed of two arms of unequal length disposed in angular relation and extending outwardly away from the shield member, a rod connecting and spacing the brackets and secured thereto at the junction of the arms, the rod being adjustable to effect the aforesaid movement of the brackets, and means for supporting the rod.

5. A windshield wing comprising a shield member, two brackets engaging the opposite upright side edges of the member, and movable vertically thereon for tightening and releasing purposes, one of the upright edges of the said member being outwardly inclined from the direction of its upper and lower ends and the other side being straight the brackets engaging said edges on opposite sides of the most prominent portion of said edge, a rod connecting the two brackets and adjustable to effect the aforesaid movement of the brackets, and means for supporting the rod.

6. A windshield wing comprising a shield member having two opposite upright sides converging towards their ends, two brackets whose ends engage the opposite upright side edges of the member, a rod connecting the two brackets and adjustable for moving the same on the edges of the member for tightening and releasing purposes, clips mounted on the rod, and clamps connected with the clips and adapted to engage the post of the windshield for securing the wing in place.

7. A windshield wing comprising a shield member having two opposite upright sides converging towards their ends, two brackets whose ends engage the opposite upright side edges of the member, a rod connecting the two brackets and adjustable for moving the same on the edges of the member for tightening and releasing purposes, clips mounted on the rod, and clamps having ball and socket connections with the clips for purposes of adjustment in securing the wing to the side post of the windshield.

8. A windshield wing comprising a shield member having two opposite upright sides converging towards their ends, two brackets whose ends engage opposite upright side edges of the member, a rod connecting the two brackets and adjustable for moving same on the edges of the member for tightening and releasing purposes, and means connected with the rod for securing the wing in place, the rod being rotatively adjustable in said means, whereby the position of the wing may be regulated at will.

In testimony whereof I affix my signature.

WILLIAM B. SEWELL.